United States Patent [19]

Schön

[11] 4,284,501
[45] Aug. 18, 1981

[54] CONTROL APPARATUS FOR PURIFYING ACUMULATED CONDENSATE

[75] Inventor: Friedrich Schön, Erlangen, Fed. Rep. of Germany

[73] Assignee: Kraftwerk Union Aktiengesellschaft, Mülheim, Fed. Rep. of Germany

[21] Appl. No.: 182,231

[22] Filed: Aug. 28, 1980

[30] Foreign Application Priority Data

Aug. 30, 1979 [DE] Fed. Rep. of Germany ....... 2935106

[51] Int. Cl.$^3$ .............................................. C02B 1/00
[52] U.S. Cl. .................................... 210/96.1; 210/104; 210/196
[58] Field of Search ...................... 210/96.1, 104, 196, 210/918, 919

[56] References Cited

U.S. PATENT DOCUMENTS

| 3,965,005 | 6/1976 | Boyd et al. | 210/96.1 |
| 4,130,481 | 12/1978 | Chase | 210/96.1 X |
| 4,163,716 | 8/1979 | Turnbull | 210/96.1 X |

FOREIGN PATENT DOCUMENTS 2445665 4/1976 Fed. Rep. of Germany .......... 210/96.1

Primary Examiner—John Adee
Attorney, Agent, or Firm—Herbert L. Lerner; Laurence A. Greenberg

[57] ABSTRACT

Control apparatus for the purification of collected condensate, including condensers, at least two collecting chambers having open tops and at least two collecting chambers having covered tops for the condensers, a feed line having connections to the covered collecting chambers and connections for receiving run-off from the open collecting chambers, a first set of shut-off valves disposed in the feed line connections to the open collecting chambers, a main condensate pump disposed in the feed line, a purification line having connections for receiving run-off from the open collecting chambers and leading to at least one covered collecting chamber, a second set of shut-off valves disposed in the purification line connections to the open collecting chambers, a purification pump disposed in the purification line, a filter arrangement disposed in the purification line, a device for measuring conductivity of condensate in at least one of the open collecting chambers and for maintaining one of the first and second sets of shut-off valves in an open position while the other of the sets is in a closed position depending on the measured conductivity, a device for measuring condensate level in the open collecting chambers, and a maximum selection device connected to the condensate level measuring means for adjusting flow rate through the purification line depending on condensate level in the open collection chambers.

2 Claims, 1 Drawing Figure

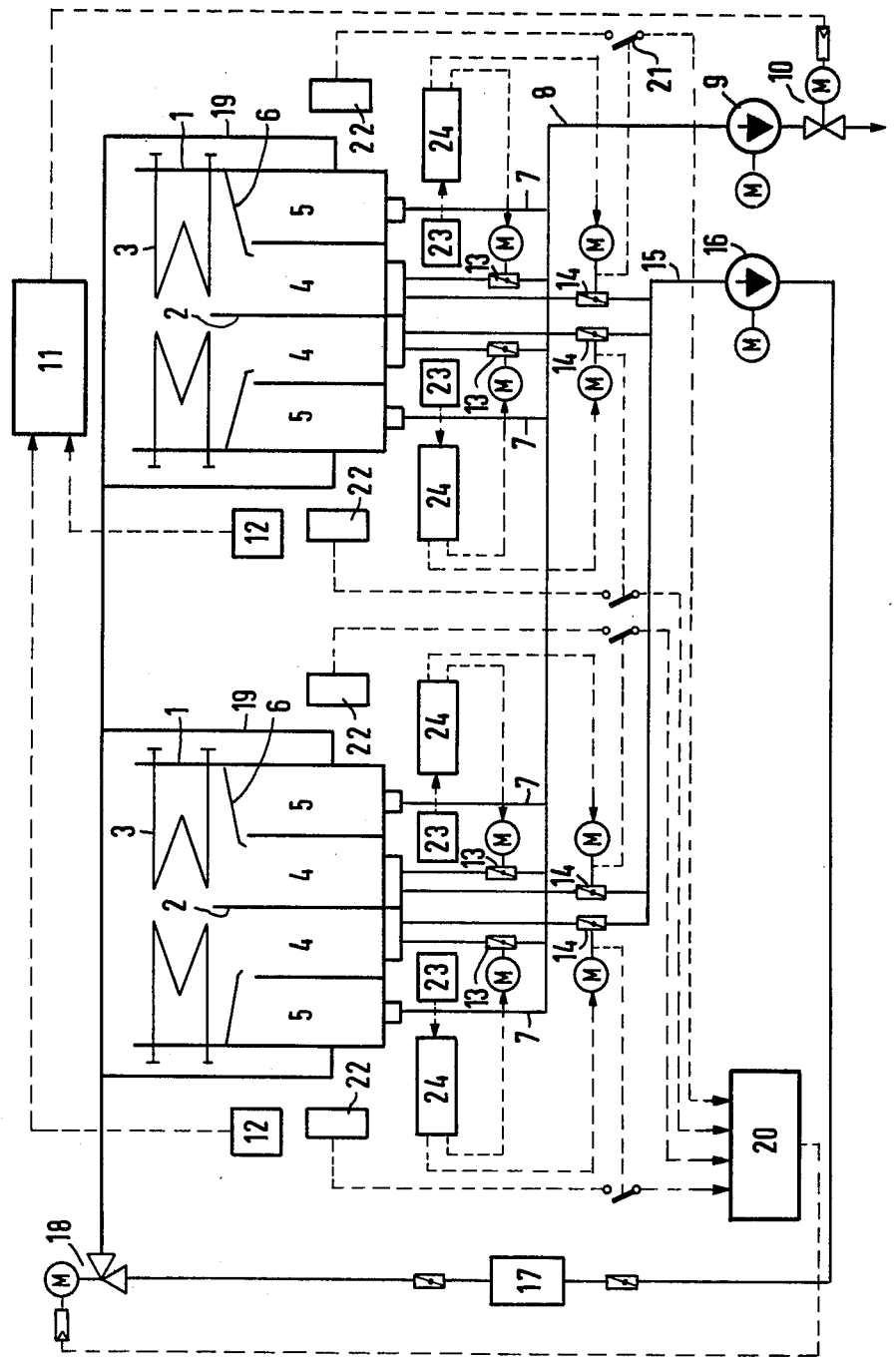

CONTROL APPARATUS FOR PURIFYING ACUMULATED CONDENSATE

The invention relates to control apparatus for purifying accumulated condensate, with condensers having collecting chambers which are open at the top and covered at the top, the covered collecting chambers being directly connected to a feed line for a main condensate pump, and including a purification line which contains a purification pump and a filter arrangement and which starts from the discharge of the open collecting chambers and leads into a covered collecting chamber. When dealing especially with steam power plants with large unit output, several condensers are required. The condensers can be constructed with collecting chambers that are partly open at the top and partly closed at the top, for the purification of the condensate. In present constructions, in order to provide for the condensate accumulating in the collecting chambers which are open at the top to be purified if necessary, the run-off of these open collecting chambers is connected to a purification line, into which a purification pump and a filter arrangement are inserted. The purified water then flows into the collecting chambers that are covered at the top and have the run-off stubs which were connected to a feed line for a condensate pump. It is thereby ensured even during the purification operation that the condensate flowing into the collecting chambers which are open at the top is first sent through the filter arrangement before it can flow into the covered collecting chambers. If the purification was not needed, the collecting chambers that are open at the top would be filled so far that the overflowing water could run into the collecting chambers which are covered at the top, below the cover.

If fouling occurs, it is necessary in such an installation to send all the condensate accumulated in all the condensers through the purification line until the cause of the fouling is eliminated.

It is accordingly an object of the invention to provide a control apparatus for purifying accumulated condensate, which overcomes the hereinafore-mentioned disadvantages of the heretofore-known devices of this general type, and in which only a partial quantity of the condensate needs to be sent through the purification line to the filter arrangement in order to keep the condensate completely clean after or during a disturbance; and that the start of the contamination in each open collecting chamber can be determined separately and rapidly.

With the forgoing and other objects in view there is provided, in accordance with the invention, a control apparatus for the purification of collected condensate, comprising condensers, at least two collecting chambers having open tops and at least two collecting chambers having covered tops for the condensers, a feed line having connections to the covered collecting chambers and connections for receiving run-off from the open collecting chambers, a first set of shut-off valves disposed in the feed line connections to the open collecting chambers, a main condensate pump disposed in the feed line, a purification line having connections for receiving run-off from the open collecting chambers and leading to at least one covered collecting chamber, a second set of shut-off valves disposed in the purification line connections to the open collecting chambers, a purification pump disposed in the purification line, a filter arrangement disposed in the purification line, means for measuring conductivity of condensate in at least one of the open collecting chambers and for maintaining one of the first and second sets of shut-off valves in an open position while the other of the sets is in a closed position depending on the measured conductivity, means for measuring condensate level in the open collecting chambers, and maximum selection means connected to the condensate level measuring means for adjusting flow rate through the purification line depending on condensate level in the open collecting chambers.

In operation without purification, the open and the closed collecting chambers are thus connected to each other in this new arrangement through the feed line to the main condensate pump so that, if impurities occur in one of the open collecting chambers, this collecting chamber is switched off the feed line and can be connected to the purification line.

In accordance with a concomitant feature of the invention, there is provided a control valve connected in series with the main condensate pump in the feed line, other means for measuring condensate level in the covered collecting chambers, and other maximum selection means for adjusting the control valve in dependence on the other condensate level measuring means for controlling water level in the condensers.

Other features which are considered as characteristic for the invention are set forth in the appended claims.

Although the invention is illustreated and described herein as embodied in a control apparatus for purifying accumulated condensate, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single FIGURE of the drawing which is a schematic and diagrammatic block diagram for the control apparatus according to the invention.

Referring now particularly to the single FIGURE of the drawing, it is seen that two condensers 1 are provided, each condenser being divided by a partition 2 into two separate halves. Heat-exchanging tubes 3 through which cooling water flows are provided for condensing the steam which flows into the condensers 1 from above. Underneath each bundle of heat-exchanging tubes 3 there are two collecting chambers 4 and 5 for the condensate produced thereby. A cover 6 covers the collecting chambers 5 at the top thereof, so that the condensate dripping down in the covered region also flows into the collecting chambers 4 which are open at the top. The collecting chambers 5 are connected by connecting lines 7 directly to a feed line 8, which leads to the suction side of a main condensate pump 9.

In order to provide level control in the condensers 1, the main condensate pump 9 is followed by a control valve 10, which is controlled by a maximum-selection device 11. Level measuring devices 12 which always determine the water level in one of the collecting chambers 5 which are covered at the top, per condenser 1 are connected to the maximum selection device 11. This assures that the water level in the covered collecting chambers 5, and in the collecting chambers 4 connected to the feed line 8 through the shut-off valves 13, remains within the set range.

According to the invention, the collecting chambers 4 which are open at the top are connected through shut-off valves 13 to the feed line 8 for the main condensate pump 9 and are also in connection, through shut-off valves 14, with a purification line 15. Through the shut-off valves 14, the condensate can therefore flow to the suction side of a purification pump 16, which is followed by a filter arrangement 17 and a level control valve 18. After passing the level control valve 18, the purified condensate flows through connecting lines 19 into the collecting chambers 5 of the individual condenser halves, which are covered at the top thereof.

The level control valve 18 is influenced by the output of a maximum selection device 20 which is connected to level measuring devices 22 by contacts 21. Each of the contacts 21 is controlled by the associated shut-off valve 14 which can connect the open-top collecting chamber 4 of the same condenser half to the purification line 15. Each contact 21 is therefore closed if the associated shut-off valve 14 is open. In this manner it is assured that the maximum-selection device delivers an output quantity which corresponds to the highest water level in the open collecting chambers 4 connected to the purification line 15 and that therefore, the water level of this open collecting chamber 4 which is connected to the purification line 15, stays within this set range.

The open collecting chambers 4 are switched from the feed line 8 to the purification line 15 by means of conductivity measuring devices 23 which, in the embodiment example, precede the shut-off valves 13. However, these devices can also be disposed within the open collecting chamber 4. If a given value of the conductivity of the water is exceeded, it can be concluded therefrom that the degree of contamination of the water has exceeded a permissible value. In that case, a comparator 24 associated with each conductivity measuring device 23 delivers an output signal, in dependence on which the respective valves 13 are closed and the associated valves 14 are opened.

With the hereinafore-described apparatus the following operation is obtained:

In operation without purification, the shut-off valves 13 are open and the shut-off valves 14 are closed. The level measuring devices 12 hold the water level in the covered-top collecting chambers 5 within the set range. The collecting chambers 5 are connected to the collecting chambers 4 through the connecting lines 7 and the opened shut-off valves 13, so that in the collecting chambers 4 about the same water level is obtained as in the collecting chambers 5. Therefore there is no overflow from the collecting chambers 4 into the collecting chambers 5. If an excessive degree of contamination is ascertained in one of the open collecting chambers 4 through response of the comparator 24, the shut-off valve 13 is closed and the associated shut-off valve 14 is opened.

The condensate produced in the respective collecting chamber 4 therefore flows into the purification line 15; to the filter arrangement 17; through the connecting lines 19 into the collecting chamber 5 which is covered at the top; and then flows through the connecting lines 7 into the feed line 8. This can happen, depending on the disturbance that occurs, sequentially or simultaneously in only one or in several of the open-top collecting chambers without the operation of the power station being degraded.

Through a direct additional connection of the open collecting chambers 4 to the feed line 8, the respective conductivity measuring device 23 can be disposed in such a way that occurring contamination in the respective open collecting chambers can be detected immediately. Therefore, the open collecting chambers 4 can be switched in time to the purification line 15 after the contamination has occurred. This is also true if other open collecting chambers 4 are already switched to the purification line 15 and condensate therefore returns through the filter arrangement 17 and the connecting lines 19 into the covered collecting chambers 5. For a thorough purification of the condensate produced, only a partial quantity depending on the number of open collecting chambers needs to be sent through the filter arrangement 17. If the water demand in the normal feed line 8, which is important for the operation, is temporarily rising, the water volume of the open-top collecting chambers 4, with the valves 13 thereof leading to the feed line 8 being open, can also be used directly for covering the demand for condensate. The measuring devices 12, 22 and 23 are, of course, shown diagrammatically and spaced at a distance from the liquid to be measured. It is, however, to be understood that any suitable means for performing such measurements could be used and placed in any location, either in contact with or spaced from the liquid or vessel carrying it.

There are claimed:

1. Control apparatus for the purification of collected condensate, comprising condensers, at least two collecting chambers having open tops and at least two collecting chambers having covered tops for said condensers, a feed line having connections to said covered collecting chambers and connections for receiving run-off from said open collecting chambers, a first set of shut-off valves disposed in said feed line connections to said open collecting chambers, a main condensate pump disposed in said feed line, a purification line having connections for receiving run-off from said open collecting chambers and leading to at least one covered collecting chamber, a second set of shut-off valves disposed in said purification line connections to said open collecting chambers, a purification pump disposed in said purification line, a filter arrangement disposed in said purification line, means for measuring conductivity of condensate in at least one of said open collecting chambers and for maintaining one of said first and second sets of shut-off valves in an open position while the other of said sets is in a closed position depending on the measured conductivity, means for measuring condensate level in said open collecting chambers, and maximum selection means connected to said condensate level measuring means for adjusting flow rate through said purification line depending on condensate level in said open collection chambers.

2. Control apparatus according to claim 1, including a control valve connected in series with said main condensate pump in said feed line, other means for measuring condensate level in said covered collecting chambers, and other maximum selection means for adjusting said control valve in dependence on said other condensate level measuring means for controlling a maximum water level in said condensers.

* * * * *